United States Patent [19]

Gardner et al.

[11] 4,062,796
[45] Dec. 13, 1977

[54] METHODS FOR INHIBITING SCALE FORMATION

[75] Inventors: Tommy R. Gardner; Robert W. Lansford, both of Duncan, Okla.

[73] Assignee: Halliburton Company, Duncan, Okla.

[21] Appl. No.: 660,292

[22] Filed: Jan. 26, 1976

Related U.S. Application Data

[62] Division of Ser. No. 423,638, Dec. 10, 1973, abandoned, which is a division of Ser. No. 218,597, Jan. 17, 1972, Pat. No. 3,832,302.

[51] Int. Cl.$^2$ ............................................... C02B 5/06
[52] U.S. Cl. .............................. 252/180; 252/8.55 B; 252/8.55 R; 252/181; 210/58
[58] Field of Search ................ 252/8.55 R, 8.55 B, 252/180, 181; 210/58

[56] References Cited

U.S. PATENT DOCUMENTS

3,654,993   4/1972   Smith et al. .................... 252/8.55 E

OTHER PUBLICATIONS

Bockstie et al., "Control of Corrosion in Caustic Solutions," J. Electrochem. Soc., vol. 110, No. 4 (1963) pp. 267–271.

*Primary Examiner*—Mayer Weinblatt
*Attorney, Agent, or Firm*—Thomas R. Weaver; John H. Tregoning

[57] ABSTRACT

A composition for inhibiting scale and methods of using said composition consisting of a relatively water-insoluble organic precipitate formed by the reaction of a water-soluble polyelectrolytic organic polymer having an average molecular weight in the range of from about 1,000 to about 100,000 and a water-soluble organic cationic surface active compound.

5 Claims, No Drawings

METHODS FOR INHIBITING SCALE FORMATION

This is a division of application Ser. No. 423,638, filed Dec. 10, 1973, now abandoned which is a division of application Ser. No. 218,597, filed Jan. 17, 1972, now U.S. Pat. No. 3,832,302, issued Aug. 27, 1974, entitled "Methods for Inhibiting Scale Formation."

This invention relates to preventing the formation of scale in systems containing aqueous solutions. The term "scale" is used herein to mean deposits formed on surfaces in contact with aqueous solutions due to the precipitation of scale forming compounds from the aqueous solutions. The term "scale forming compounds" is used herein to mean those compounds commonly associated with hard water and the brines produced from water and oil wells, e.g., calcium carbonate, calcium sulfate, barium sulfate and strontium sulfate. Other water-insoluble sulfates and carbonates may be classified as scale but are usually found in small quantities as compared with the foregoing compounds.

Water or aqueous solutions containing ionized scale forming compounds are utilized in many domestic and industrial applications for a variety of purposes. Because these aqueous solutions are subjected to changes in chemical environment, the scale forming compounds precipitate and are deposited on the surfaces of the systems within which the aqueous solutions are contained. The deposition of scale within such systems causes severe problems among which are the restriction of fluid flow, the reduction of heat transfer, the decrease in equipment life due to excessive wear, corrosion attack, etc.

The handling of water and brines produced from underground formations presents particularly severe scale formation problems. For example, the brines produced from oil wells contain high concentrations of scale forming compounds, and due to the changes in temperature, pressure and other physical conditions of the brines as they are produced, precipitation and deposition of scale in the producing formation, flow lines, separators and other producing and handling equipment frequently occurs.

In preventing the deposition of scale on equipment surfaces in contact with aqueous solutions, the utilization of a solid composition which effectively inhibits the precipitation of scale forming compounds at low concentrations and which is relatively water-insoluble is highly advantageous. That is, continuous protection over an extended period of time can be insured through the use of a slowly soluble solid composition introduced into the system containing the aqueous solution. Further, particularly in water and brine producing wells, it is advantageous to place such an inhibitor in the porous producing formation adjacent to the well bore so that as water and brines are produced from the formation effective quantities of the inhibitor are dissolved therein thereby insuring prevention of scale deposition in flow lines and on downstream equipment surfaces. The in situ formation of an inhibitor composition in an underground producing formation obviates the heretofore encountered problems associated with squeezing inhibiting agents into well formations whereby large amounts of the inhibiting agents are immediately produced back and wasted.

By the present invention novel liquid additives and solid compositions are provided which are utilized to prevent the precipitation of scale forming compounds from aqueous solutions. A liquid additive of the present invention is introduced to the system to be protected, and when contacted by the aqueous solution contained therein, the additive reacts to form, in situ, a solid composition which upon being slowly dissolved by the aqueous solution substantially prevents the precipitation of scale therefrom. The solid composition is relatively insoluble in aqueous solutions over a wide pH range, including neutral, strongly basic and strongly acidic solutions.

When the solid composition is formed in place in a container, particularly a steel vessel or pipeline, it adheres to the confining walls of the container to form a coating therein which slowly dissolves in aqueous solutions over an extended period of time. As the composition dissolves it reacts with scale forming compounds contained in the aqueous solution to thereby prevent the formation of scale within the container. Containers having structural materials other than steel and various other materials to which the reaction product will adhere include clays, salts, sand, sandstone, limestone, dolomite, glass, gravel, aluminum, enamels, elastomers, straw, vegetable matter and the like. The fact that the composition adheres to the walls of the confining container is important in that long term protection against scale depositions even after the coating has been subjected to the prolonged pressure of strong acidic and basic solutions is obtained.

The liquid additive of the present invention basically comprises a mixture of a water-soluble polyelectrolytic organic polymer having an average molecular weight in the range of from about 1,000 to 100,000 and a water-soluble organic cationic surface active compound. When added to an excess of water or aqueous solution, the mixed components of the additive react to form the relatively water-insoluble solid composition of the present invention. The solid composition is an organic complex which upon dissolution is effective in small quantities for inhibiting the precipitation of scale forming compounds from aqueous solutions.

Among the polyelectrolytic organic polymers suitable for use in accordance with the present invention are the polymers of compounds having the formula

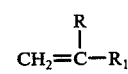

wherein
R is selected from the group consisting of hydrogen or a methyl radical, and
$R_1$ is selected from the group consisting of nitrile, amide and carboxyl radicals; and the water soluble salts thereof.

For example, homopolymers and copolymers of acrylic acid, methacrylic acid, acrylamide and methacrylamide, the alkali metal and ammonium salts of the polymers and mixtures of the salts and polymers are particularly suitable. In addition, polymers of the N-alkyl substituted amides, the N-aminoalkylamides, and the corresponding N-alkylaminoalkyl substituted amides may be utilized. Polymers of the aminoalkyl acrylates, the aminoalkyl methacrylamides, and the N-alkyl substituted aminoalkyl esters of either acrylic or methacrylic acids may be utilized as well as copolymers of the foregoing compounds with other copolymerizing monomers such as ethylene, propylene, isobutylene, etc. In general, ethylenic polyelectrolytic organic polymers having numerous side chains distributed along a substantially continuous carbon atom molecule may be utilized in accordance with the present invention. The side chains may be hydrocarbon groups, carboxylic acid groups or derivatives thereof, sulfonic acid groups or derivatives thereof, phosphoric acid or derivatives thereof, heterocyclic nitrogen groups, aminoalkyl groups, alkoxy radicals and other organic groups. The number and the relative proportions of the hydrophilic and hydrophobic groups must be such that a water-soluble polymeric compound having a substantially large number of ionizable radicals results. Generally, the higher the molecular weight of the polymer the less water-soluble it is. However, polymers being average molecular weights of from 1,000 up to about 100,000 may be utilized. Polymers having an average molecular weight of from about 1,000 to 30,000 are preferred and those having average molecular weights of from 1,000 to 10,000 are most preferred.

The water-soluble polyelectrolytic organic polymers preferred for use in the present invention are those selected from the group consisting of homopolymers and copolymers of acrylic acid, methacrylic acid, acrylamide and methacrylamide, the alkali metal and ammonium salts of said polymers and mixtures of said polymers and salts. A homopolymer of acrylic acid wherein about 70% of the active hydrogen atoms have been replaced by sodium ions having an average molecular weight in the range of from about 1,000 to about 10,000 is most preferred.

A great variety of water-soluble organic cationic surface active compounds are commercially available and may be used in accordance with the present invention. For example, aliphatic (fatty) amines and their derivatives, e.g., the dimethyl dodecylamine oxide acetate of tertiary fatty amines; homologues of aromatic amines having fatty chains, e.g., dodecylaniline; fatty amides derived from aliphatic diamines, e.g., 1-hydroxyethyl-2-heptadecenyl glyoxacline; and fatty amides derived from disubstituted amines, e.g., the formate of an oleyl amide derivative of ethylene diamine. In addition, a variety of quaternary ammonium compounds may be utilized having the general formula

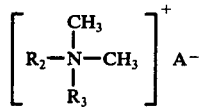

wherein
$R_2$ represents hydrogen or an alkyl radical having from 1 to 20 carbon atoms,
$R_3$ represents an alkyl or aryl radical having from 1 to 20 carbon atoms, and
A is an anion selected from the group consisting of halide, acetate, sulfate, nitrate and hydroxide, and mixtures of the compounds. Examples of such quaternary ammonium compounds include trimethyl-1-methyl-n-pentadecylammonium chloride, trimethyl-n-octadecylammonium bromide, trimethyl-1-methyl-n-nonadecylammonium acetate, trimethyl-n-octylammonium hydroxide, trimethyl-n-dodecylammonium nitrate, and trimethyl-n-decylammonium sulfate.

Other organic cationic surface active compounds useful in accordance with the present invention are those ammonium compounds derived from fatty amides of disubstituted diamines such as monstearyl ethylene diamine and triethyl ammonium methyl sulfate as well as ammonium compounds of the benzimidazolines such as methylheptadecyl benzimidazol hydrobromide and heptadecyl N-benzyl benzimidazol. Basic compounds or pyridinium and its derivatives may be utilized such as cetyl pyridinium chloride and octadecyl pyridinium hydrobromide. Basic compounds of sulfonium phosphonium and antimonium, e.g., octadecyl sulfonium methyl sulfate, and the urethanes or basic salts of ethylene diamine such as a steric acid condensate with diethylene triamine may also be used.

Preferred organic cationic surface active compounds for use in accordance with the present invention are as follows:

a. an amine having the following formula

wherein $R_4$ represents hydrogen or an alkyl radical having from 8 to 18 carbon atoms and $R_5$ represents an alkyl radical having from 8 to 18 carbon atoms, b. a primary alkyl amine acetate having the following formula

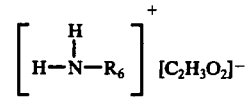

wherein $R_6$ represents an alkyl radical having from 8 to 18 carbon atoms, c. an alkyl trimethylene diamine having the following formula

$NH_3(CH_2)_3NHR_7$ wherein $R_7$ represents an alkyl radical having from 8 to 18 carbon atoms, and d. a quaternary ammonium compound having the following formula

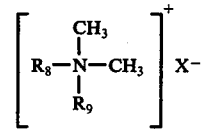

wherein $R_8$ represents hydrogen or an alkyl radical having from 1 to 20 carbon atoms, $R_9$ represents an alkyl or aryl radical having from 1 to 20 carbon atoms, and X represents a halide.

Mixtures of the above compounds may also be used.

The most preferred water-soluble organic cationic surface active compounds for use in accordance with the present invention are quaternary amonium chloride compounds or mixtures thereof having the following formula

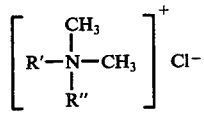

wherein

R' represents hydrogen or an alkyl radical having from 1 to 20 carbon atoms and

R" represents an alkyl or aryl radical having from 1 to 20 carbon atoms.

Examples of these compounds are myristyl dimethyl benzyl ammonium chloride, decyl trimethyl ammonium chloride and cetyl trimethyl ammonium chloride.

In the preparation of the liquid additives of the present invention, the water-soluble organic cationic surface active compound is mixed with the polyelectrolytic organic polymer in an amount preferably substantially equal to the neutralization equivalent of the organic polymer. The term "neutralization equivalent" is used herein to mean the quantity of cationic surface active compound required to supply the number of cations necessary to react with or neutralize the anionic sites on the organic polymer molecule. While any ratio of cationic surface active compound to anionic organic polymer may be utilized, the most economical procedure is to use a ratio such that the neutralization equivalent of cationic surface active compound is present, i.e., the resultant mixture is neutral when dissolved in water. This quantity, of course, varies with the particular organic polymer utilized, but may be readily determined by a variety of conventional methods such as by titrating the organic polymer to a neutralization end point and then calculating stoichiometrically the neutralization equivalent based on the particular cationic surface active compound to be used.

The surface active compound useful herein is dispersed in the organic polymer without a reaction product being formed. However, when the liquid additive mixture is dissolved in water or other aqueous solution, the components thereof, i.e., the organic polymer and surface active compound, react to form the novel solid composition of the present invention, i.e., a relatively water-insoluble organic composition. The reaction is represented as follows when an acrylic acid polymer and a quaternary ammonium chloride surface active compound are utilized:

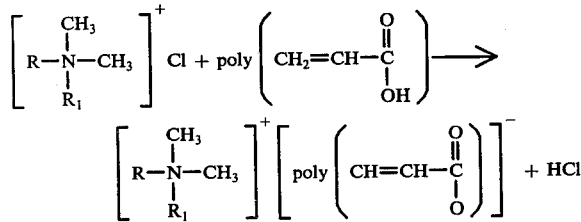

If desirable, in order to prevent the liquid additive from separating into component layers when stored or transported, a small quantity of water may be intermixed with the components of the additive in an amount just sufficient to form the additive into the "precursor" of the reaction product obtained when the mixture is added to an excess of water. The term "precursor" of the water-insoluble organic composition formed by the liquid additive in an excess of water is used to mean the homogeneous relatively clear liquid which results when a small amount of water is added to the mixture of polyelectrolytic organic polymer and organic cationic surface active compounds described above. While the specific amount of water required to form the precursor depends upon the particular polymer and surface active compound utilized in the additive mixture, the amount may readily be determined experimentally. Once the additive mixture is formed into the homogeneous precursor of the solid inhibitor composition it may be stored for indefinite periods of time without deleterious effects.

The solid organic composition of the present invention is very slowly soluble in aqueous solutions over a broad pH range, i.e., over a pH range of from 0 to 14, and is particularly suitable as a slow release scale inhibitor.

The solid composition may be formed by reacting the organic polymer and cationic surface active agent in an excess of water. The precipitate may then be separated and dried so that a solid inhibitor is obtained which can in turn be added directly to the aqueous system to be protected. If desired, however, the composition may be precipitated in the system to be protected so that it adheres to the system and is slowly dissolved over a long period of time.

As illustrated by the examples which follow, the solid composition of the present invention effectively inhibits or prevents the precipitation of ionized scale forming compounds from aqueous solutions when dissolved therein. This is due to the dissolved composition exhibiting what has heretofore been defined as the "threshold inhibition effect." When a few parts per million of a threshhold inhibitor are added to an aqueous solution containing scale forming anionic and cationic components, no interaction or precipitation occurs between the inhibitor and ionic components of the water, yet the inhibitor prevents the precipitation of the ionic components. The threshhold or inhibition property of the organic inhibitor composition of the present invention is effective when the composition is dissolved in an aqueous solution containing ionized scale forming compounds at concentrations of from about 0.1 parts per million to about 100 parts per million. The threshhold inhibition property of the dissolved composition stabilizes thousands of parts per million of scale forming ions due to surface activity and film formation on discreet particles.

The in situ formation of the solid composition of the present invention may be carried out using any of a variety of techniques depending upon the particular system to be protected. For example, if the solid composition is to be added to a system containing an aqueous solution such as an evaporative water cooler, a quantity of the liquid additive of the present invention may be introduced directly into the aqueous solution in the system and allowed to be contacted and dissolved thereby. As soon as the liquid additive is dissolved, it reacts to form the relatively water-insoluble solid composition of the present invention which is precipitated in the system and which adheres to the parts of the system in contact with the aqueous solution. The liquid additive is introduced to the system in a quantity such that an amount of solid precipitate is formed effective to prevent the formation of scale in the system over a desired period of time. That is, the precipitate remains in the system and is slowly released or dissolved by the aqueous solution contained therein thereby inhibiting the precipitation of scale forming compounds and their deposition on surfaces in contact with the aqueous solution.

The in situ formation of the solid composition of the present invention is particularly suitable for preventing the formation of scale in water and/or brine producing oil and water wells. The liquid additive of the present invention can be added in the precursor form to the oil or water well in a quantity sufficient to provide the solid precipitate in an effective amount at or near the bottom of the well. As stated previously herein, the effective concentration of the dissolved solid composition in an aqueous solution is from about 0.1 to 100 parts per million, preferably about 0.25 to 20 parts per million. Thus, the particular quantity of solid composition required to be placed in a well to provide protection over a desired period of time may be calculated and depends on the particular flow rate of water or aqueous solution produced.

Once placed in the well formation, the inhibitor additive is contacted by water or brine contained therein and dissolved thereby causing the relatively insoluble adhesive organic composition of the present invention to be precipitated. When formed, the precipitated composition dissolves in an amount effective to inhibit the precipitation of scale in the produced water or brine until exhausted. The adhesive properties of the composition cause it to adhere to surfaces within the well formation and resist the washing action of formation fluids as they are produced.

If desirable, in order to prevent the formation of the solid composition during transport of the liquid additive down the well bore, the liquid additive may be dispersed in a water free carrying fluid such as diesel oil and the dispersion pumped into the formation. After the dispersion is placed in the formation the well is returned to normal production so that the inhibitor additive is dissolved and the organic composition formed, or alternatively, a water overflush may be utilized to bring about the in situ formation of the composition.

Due to the adhesive properties and very low solubility of the solid composition it remains in the formation over a long time period and is slowly dissolved in produced water or brine thereby preventing the formation of scale in the formation and production equipment. Further, should remedial acidizing of the formation be required subsequent to placing the composition of the present invention therein, the composition will not be destroyed by the acid treatment.

The following examples are set forth to more clearly illustrate the present invention, but are not to be considered as limiting the scope of the invention.

EXAMPLE 1

This example illustrates the scale inhibiting effectiveness of the solid organic composition formed by the reaction of a homopolymer of acrylic acid having about 70% of the active hydrogen ions replaced by sodium ions and having an average molecular weight in the range of from about 1,000 to 10,000, and a mixture of alkyl dimethyl quaternary ammonium chloride compounds wherein the alkyl substituents range from 1 to 20 carbon atoms. Mixtures of the polyacrylate and quaternary ammonium chloride compounds are prepared on a weight basis of 8:1 and 4:1, respectively. Various quantities of the liquid mixtures are then added to aqueous test solutions containing excess calcium and sulfate ions. After stirring, the test solutions including a blank solution, i.e., a test solution which does not contain inhibitor, are allowed to stand for 24 hours at 72° F. At the end of the 24 hour period, aliquots of the test solutions are taken and the amount of calcium held in the solutions determined by conventional titration procedures. The results of these tests are shown in Table I.

TABLE I

COMPARISON OF 24 HOUR CALCIUM SULFATE SCALE INHIBITION at 72° F FOR VARIOUS INHIBITOR CONCENTRATIONS

| Inhibitor Composition Concentration (ppm) | Weight Ratio of Polymer to Surface Active Compound | Amount of Calcium Ions Held In Solution (ppm) |
|---|---|---|
| 0 (blank test solution) | | 1600 |
| 5 | 8:1 | 1720 |
| 5 | 4:1 | 1760 |
| 10 | 8:1 | 1960 |
| 10 | 4:1 | 1880 |
| 20 | 8:1 | 2240 |
| 20 | 4:1 | 2780 |
| 50 | 8:1 | 4060 |
| 50 | 4:1 | 4060 |
| 100 | 8:1 | 5000 |
| 100 | 4:1 | 5000 |

From the above table it may be seen that the dissolved solid inhibitor composition effectively inhibits the precipitation of calcium sulfate, i.e., holds the calcium ions in solution, and as the concentration of the dissolved composition is increased up to 100 ppm the amount of calcium ions held in solution increases.

EXAMPLE 2

Polyacrylic acid having about 70% of the active hydrogen atoms replaced by sodium ions and having an average molecular weight in the range of from about 1,000 to about 10,000 is added to an excess of distilled water and titrated with 0.2 N-sodium hydroxide to a phenolphthalein end point. The neutralization equivalent of N-dodecylamine acetate is calculated and a mixture of the partially neutralized sodium salt of polyacrylic acid and N-dodecylamine acetate is prepared with the N-dodecylamine acetate present in an amount equal to 10% of the neutralization equivalent. The resulting liquid additive mixture is introduced into test solutions containing excess calcium and sulfate ions at various concentrations. A comparison of the amounts of calcium ions held in solution after 24 hours at 72° F is given in Table II below.

TABLE II

COMPARISON OF 24 HOUR CALCIUM SULFATE SCALE INHIBITION AT 72° F FOR VARIOUS POLYACRYLATE-PRIMARY AMINE ACETATE ADDITIVE CONCENTRATIONS

| Inhibitor Additive Concentration (ppm) | Weight Ratio of Polymer to Surface Active Compound at 10% of Neutralization Equivalent | Amount of Calcium Ions Held In Solution (ppm) |
|---|---|---|
| 0 | — | 1600 |
| 1.05 | 1:0.05 | 1740 |
| 5.25 | 5:0.25 | 3400 |
| 10.5 | 10:0.5 | 4520 |
| 21.0 | 20:1.0 | 5000 |

EXAMPLE 3

The test procedure of Example 2 is repeated except that polyacrylate-N-dodecylamine acetate inhibitor additives are prepared with N-dodecylamine acetate concentrations of 25%, 50%, 75% and 100% of the calculated neutralization equivalent, respectively. Each of the additive mixtures are introduced to test solutions containing excess calcium and sulfate ions. The amount of calcium ions held in solution after 24 hours at 72° F is shown in Table III below.

TABLE III
COMPARISON OF 24 HOUR CALCIUM SULFATE SCALE INHIBITION AT 72° F FOR POLYACRYLATE-PRIMARY AMINE ACETATE ADDITIVE

| Inhibitor Additive Concentration (ppm) | % Neutralization Equivalent N-Dodecylamine Acetate | Amount of Calcium Ions Held In Solution (ppm) |
|---|---|---|
| 0 | — | 1000 |
| 11.25 | 25 | 4860 |
| 12.5 | 50 | 4800 |
| 13.75 | 75 | 4700 |
| 15.0 | 100 | 5000 |

EXAMPLE 4

The test procedure of Example 2 is repeated using various organic compositions formed from a partially neutralized sodium salt of polyacrylic acid (70% of active hydrogen ions replaced by sodium ions) having a molecular weight in the range of from 1,000 to 10,000 and various cationic surface active agents at various concentrations. The results of these tests are shown in Table IV below.

TABLE IV
COMPARISON OF 24 HOUR CALCIUM SULFATE SCALE INHIBITION AT 72° F FOR VARIOUS INHIBITOR COMPOSITIONS

| Inhibitor Composition | % Neutralization Equivalent Surface Active Compound | Inhibitor Concentration (ppm) | Amount of Calcium Ions Held In Solution (ppm) |
|---|---|---|---|
| — | — | 0 | 1600 |
| Polyacrylate-Coco Trimethylene Diamine | 10% | 10.7 | 4320 |
| Polyacrylate-Coco Trimethylene Diamine | 100% | 17.46 | 3400 |
| Polyacrylate-Bis-2 Hydroxyethyl Amine | 10% | 10.63 | 4140 |
| Polyacrylate-Bis-2 Hydroxyethyl Amine | 100% | 16.4 | 3000 |
| Polyacrylate-Dodecyl Trimethyl Ammonium Chloride | 10% | 12.1 | 3960 |
| Polyacrylate-Dodecyl Trimethyl Ammonium Chloride | 100% | 34.0 | 3500 |
| Polyacrylate-Octadecyl Trimethyl Ammonium Chloride | 10% | 12.6 | 3690 |
| Polyacrylate-Octadecyl Trimethyl Ammonium Chloride | 100% | 36.6 | 3600 |
| Polyacrylate-Tallowdicoco Dimethyl Ammonium Chloride | 10% | 11.58 | 3600 |
| Polyacrylate-Tallowdicoco Dimethyl Ammonium Chloride | 100% | 25.9 | 3220 |

From the foregoing it may be seen that the solid organic inhibitor compositions of the present invention upon dissolution effectively inhibit the precipitation of calcium sulfate from aqueous solutions at various concentrations and at various ratios of polymer to surface active compound.

EXAMPLE 5

The test procedure of Example 2 is repeated except that the temperature of the test solutions is maintained at 180° F. The results of these tests are shown below.

TABLE V
COMPARISON OF 24 HOUR CALCIUM SULFATE SCALE INHIBITION AT 180° F FOR VARIOUS INHIBITOR COMPOSITIONS

| Inhibitor Composition | Inhibitor Composition Concentration (ppm) | Amount of Calcium Ions Held In Solution (ppm) |
|---|---|---|
| — | 0 | 1450 |
| Polyacrylate-N-Dodecyl Amine Acetate | 5.25 | 1530 |
| Polyacrylate-N-Dodecyl Amine Acetate | 10.5 | 1760 |
| Polyacrylate-Dodecyl Trimethyl Ammonium Chloride | 6.09 | 1630 |
| Polyacrylate-Dodecyl Trimethyl Ammonium Chloride | 12.1 | 1700 |

EXAMPLE 6

The test procedure of Example 2 is repeated except that the test solutions contain an excess of calcium and carbonate ions. The results of these tests are shown in Table VI.

TABLE VI
COMPARISON OF 24 HOUR CALCIUM CARBONATE SCALE INHIBITION AT 72° F FOR VARIOUS INHIBITOR COMPOSITIONS

| Inhibitor Composition | Inhibitor Composition Concentration (ppm) | Amount of Calcium Ions Held In Solution (ppm) |
|---|---|---|
| — | 0 | 25 |
| Polyacrylate-N-Dodecyl Amine Acetate | 5.25 | 70 |
| Polyacrylate-N-Dodecyl Amine Acetate | 10.5 | 80 |
| Polyacrylate-Alkyl Dimethyl Benzyl Ammonium Chloride | 7.1 | 70 |
| Polyacrylate-Alkyl Dimethyl Benzyl Ammonium Chloride | 14.2 | 70 |

EXAMPLE 7

The static water solubility of a polyacrylate inhibitor composition of the present invention is compared to the static water solubility of a calcium salt of the same polyacrylic acid. The results of the comparison are shown in Table VII below.

TABLE VII
TEST CONDITIONS: STATIC TAP WATER MAINTAINED AT 72° F

| Inhibitor Composition | Test Period | Concentration of Inhibitor Dissolved In Water At End Of Test Period (ppm) |
|---|---|---|
| Polyacrylate-Myristyl Dimethyl Benzyl Ammonium Chloride | 21 days | 200 |
| Calcium Salt of Polyacrylic Acid | 24 hours | 968 |

From Table VII it may be seen that the solid inhibitor composition of the present invention is insoluble to a greater degree than the polyacrylic acid salts, and as a result, is more efficient and economical when utilized as a slow release scale inhibitor.

EXAMPLE 8

The solid inhibitor composition formed by the reaction of polyacrylic acid having 70% of the active hydrogen ions replaced with sodium ions and an average molecular weight between 1,000 and 10,000 and a mixture of alkyl dimethyl quaternary amonium chloride compounds wherein the alkyl substituents range from 1 to 20 carbon atoms is prepared. In addition, the calcium salt of the same partially neutralized polyacrylic acid is prepared. Various acid and alkaline solutions are prepared and 2 gm amounts of the calcium polyacrylate salt and the solid polyacrylate-surface active compound composition are added to separate 200 cc portions of the solutions. The test solutions are observed for 24 hours to determine the solubility of the compositions therein. The results of these tests are shown in Table VIII below.

onic surface active compound selected from the group consisting of:

a primary alkylamine acetate having the following formula

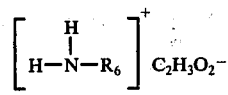

wherein $R_6$ represents an alkyl radical having from 8 to 18 carbon atoms, a quaternary ammonium compound having the following formula

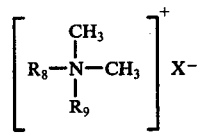

wherein $R_8$ represents hydrogen or an alkyl radical

TABLE VIII

SOLUBILITY OF VARIOUS COMPOSITIONS IN VARIOUS ACID AND ALKALINE SOLUTIONS

| Solvent | Solvent pH | Composition Tested | Remarks |
|---|---|---|---|
| 15% Hydrochoric Acid | less than 1 | Polyacrylate-Surface Active Compound Composition | Only Slightly Dissolved |
| 15% Hydrochloric Acid | less than 1 | Calcium Polyacrylate Salt | Completely Dissolved |
| 5% Hydrochloric Acid | less than 1 | Polyacrylate-Surface Active Compound Composition | Only Slightly Dissolved |
| 5% Hydrochloric Acid | less than 1 | Calcium Polyacrylate Salt | Completely Dissolved |
| 5% Acetic Acid | less than 1 | Polyacrylate-Surface Active Compound Composition | Only Slightly Dissolved |
| 5% Acetic Acid | less than 1 | Calcium Polyacrylate Salt | Completely Dissolved |
| 1.0 N Sodium Hydroxide | 14 | Polyacrylate-Surface Active Compound Composition | Only Slightly Dissolved |
| 1.0 N Sodium Hydroxide | 14 | Calcium Polyacrylate Salt | Completely Dissolved |
| 0.1 N Sodium Hydroxide | 14 | Polyacrylate-Surface Active Compound Composition | Only Slightly Dissolved |
| 0.1 N Sodium Hydroxide | 14 | Calcium Polyacrylate Salt | Completely Dissolved |
| 1.0 N Potassium Hydroxide | 14 | Polyacrylate-Surface Active Compound Composition | Only Slightly Dissolved |
| 1.0 N Potassium Hydroxide | 14 | Calcium Polyacrylate Salt | Completely Dissolved |
| 0.1 N Potassium Hydroxide | 14 | Polyacrylate-Surface Active Compound Composition | Only Slightly Dissolved |
| 0.1 N Potassium Hydroxide | 14 | Calcium Polyacrylate Salt | Completely Dissolved |

EXAMPLE 9

An oil well completed open hole at a depth of 10,200 feet in the Penn formation produces 80 barrels of oil and 60 barrels of brine per day. The well production is completely shut off every 90 days due to the formation of calcium carbonate scale and treatment with acid is required in order to free the pump for pulling followed by a clean-up job.

After acidizing and clean-up, 80 gallons of a liquid additive comprised of a mixture of a partially neutralized sodium salt of polyacrylic acid having an average molecular weight in the range of from 1,000 to 10,000 and an alkyl dimethyl quaternary ammonium chloride surface active compound is introduced to the producing formation followed by 2,000 gallons of fresh water. After the well is shut-in overnight, production is resumed and the well produces a steady 80 barrels of oil and 60 barrels of brine per day on a continuous basis for 9 months without acidizing treatments being necessary.

What is claimed is:

1. A liquid additive for inhibiting the precipitation of scale forming compounds from aqueous solutions consisting essentially of a mixture of a homopolymer of acrylic acid wherein about 70% of the active hydrogen ions are replaced by sodium ions, said polymer having an average molecular weight in the range of from about 1,000 to about 10,000, and a water-soluble organic cationic surface active compound selected from the group consisting of: a primary alkylamine acetate having the following formula having from 1 to 20 carbon atoms, $R_9$ represents a benzyl radical and X represents a halide, and mixtures of said compounds wherein said water-soluble organic cationic surface active compound is present in said additive in an amount substantially equal to the neutralization equivalent of said acrylic acid polymer.

2. The additive of claim 1 wherein said water-soluble organic cationic surface active compound is said quaternary ammonium compound.

3. The additive of claim 2, wherein said water-soluble organic cationic surface active compound is myristyl dimethyl benzyl ammonium chloride.

4. The additive of claim 2 wherein water is present in said additive in an amount sufficient to form the precursor of the relatively water-insoluble solid reaction product formed when said additive is dissolved in an excess of water but not in an amount sufficient to bring about the precipitation of said relatively water-insoluble reaction product.

5. The additive of claim 3 wherein water is present in said additive in an amount sufficient to form the precursor of the relatively water-insoluble solid reaction product formed when said additive is dissolved in an excess of water but not in an amount sufficient to bring about the precipitation of said relatively water-insoluble reaction product.

* * * * *